(12) United States Patent
Manuel

(10) Patent No.: US 7,278,197 B2
(45) Date of Patent: Oct. 9, 2007

(54) METHOD FOR PRODUCING A TOOL

(75) Inventor: Mark Manuel, Shelby Township, MI (US)

(73) Assignee: FloodCooling Technologies, LLC, Bloomfield Hills, MI (US)

( * ) Notice: Subject to any disclaimer, the term of this patent is extended or adjusted under 35 U.S.C. 154(b) by 244 days.

(21) Appl. No.: 11/037,615

(22) Filed: Jan. 18, 2005

(65) Prior Publication Data

US 2006/0157877 A1    Jul. 20, 2006

(51) Int. Cl.
*B23P 25/00* (2006.01)

(52) U.S. Cl. .................. 29/458; 29/525.13; 29/525.14; 29/527.2; 29/527.3; 29/527.5; 29/530; 428/615

(58) Field of Classification Search .................. 29/458, 29/463, 525.13, 525.14, 527.2, 527.3, 527.5, 29/530; 419/61; 428/615, 654, 650
See application file for complete search history.

(56) References Cited

U.S. PATENT DOCUMENTS

| | | | |
|---|---|---|---|
| 1,539,887 A | 6/1925 | Vandergrift |
| 3,416,766 A | 12/1968 | Miller |
| 3,723,584 A | 3/1973 | Nussbaum |
| 3,811,175 A | 5/1974 | Garner et al. |
| 4,141,531 A | 2/1979 | Strausfeld |
| 4,474,722 A | 10/1984 | Martin |
| 4,702,969 A | 10/1987 | Bunkoczy |
| 4,746,055 A | 5/1988 | Ingram |
| 4,810,591 A | 3/1989 | Sakai |
| 4,867,412 A | 9/1989 | Greune |
| 4,946,552 A | 8/1990 | Onnie |
| 4,997,602 A | 3/1991 | Trimble |
| 5,031,483 A | 7/1991 | Weaver |
| 5,032,469 A | 7/1991 | Merz |
| 5,079,102 A | 1/1992 | Tanaka |
| 5,106,290 A | 4/1992 | Carver et al. |
| 5,151,167 A | 9/1992 | Truong |
| 5,156,322 A | 10/1992 | Do-Thoi et al. |
| 5,189,781 A | 3/1993 | Weiss et al. |
| 5,247,861 A | 9/1993 | Jahn |
| 5,256,496 A | 10/1993 | Kluczynski |
| 5,273,803 A | 12/1993 | Metcalf |
| 5,330,343 A | 7/1994 | Berteau |
| 5,345,052 A | 9/1994 | Puddephatt |
| 5,347,423 A | 9/1994 | deNeuf |

(Continued)

FOREIGN PATENT DOCUMENTS

DE    3808363 A1    9/1989

(Continued)

OTHER PUBLICATIONS

XP-000803370, filed Nov. 1998, Walczyk.

(Continued)

*Primary Examiner*—Jermie E. Cozart
(74) *Attorney, Agent, or Firm*—Brooks Kushman P.C.

(57) ABSTRACT

A tool 10 which is made by a method which efficiently allows internal passageways, such as passageway 50, which are at least partially circumscribed by thermally conductive material 103, to be formed in the tool 10, thereby allowing for enhanced cooling characteristics and allowing decreased cycle time and a reduced likelihood of damage to the formed object.

14 Claims, 2 Drawing Sheets

U.S. PATENT DOCUMENTS

| | | | |
|---|---|---|---|
| 5,377,116 A | 12/1994 | Wayne et al. | |
| 5,399,239 A | 3/1995 | Pai | |
| 5,400,946 A | 3/1995 | Weise et al. | |
| 5,421,544 A | 6/1995 | Roop | |
| 5,437,547 A | 8/1995 | Holton et al. | |
| 5,439,622 A | 8/1995 | Pennisi et al. | |
| 5,462,263 A | 10/1995 | Feltrin | |
| 5,529,805 A | 6/1996 | Iacovangelo et al. | |
| 5,641,448 A | 6/1997 | Yeung | |
| 5,775,402 A | 7/1998 | Sachs et al. | |
| 5,779,833 A | 7/1998 | Cawley et al. | |
| 5,792,492 A | 8/1998 | Takahashi | |
| 5,793,015 A | 8/1998 | Walczyk | |
| 5,814,161 A | 9/1998 | Sachs et al. | |
| 5,830,585 A | 11/1998 | Hosoe | |
| 5,847,958 A | 12/1998 | Shaikh et al. | |
| 5,855,933 A | 1/1999 | Schmetz | |
| 5,869,353 A | 2/1999 | Levy | |
| 5,878,619 A | 3/1999 | Walczak | |
| 5,948,548 A | 9/1999 | Welty | |
| 6,024,851 A | 2/2000 | Radhakrishnan | |
| 6,025,036 A | 2/2000 | McGill | |
| 6,038,525 A | 3/2000 | Maguire | |
| 6,060,392 A | 5/2000 | Essaian | |
| 6,063,436 A | 5/2000 | Pavell | |
| 6,081,328 A | 6/2000 | Eng | |
| 6,090,207 A | 7/2000 | Knauss | |
| 6,090,507 A | 7/2000 | Grenon | |
| 6,103,402 A | 8/2000 | Marcin, Jr. | |
| 6,109,332 A | 8/2000 | Sachs | |
| 6,113,752 A | 9/2000 | Hollstein | |
| H1933 H | 1/2001 | Zabinski | |
| 6,209,847 B1 | 4/2001 | Frul | |
| 6,276,053 B1 | 8/2001 | Sinnesal | |
| 6,354,361 B1 | 3/2002 | Sachs et al. | |
| 6,355,331 B2 | 3/2002 | Hillier | |
| 6,391,473 B2 | 5/2002 | Numakura | |
| 6,401,001 B1 | 6/2002 | Jang et al. | |
| 6,472,029 B1 | 10/2002 | Skszek | |
| 6,495,272 B1 | 12/2002 | Creber et al. | |
| 6,536,088 B1 | 3/2003 | Chiang | |
| 6,587,742 B2 | 7/2003 | Manuel et al. | |
| 6,627,835 B1 | 9/2003 | Chung | |
| 6,796,020 B2 * | 9/2004 | Thompson | 29/712 |
| 7,021,523 B2 * | 4/2006 | Manuel | 228/245 |
| 2002/0100858 A1 | 8/2002 | Weber | |
| 2002/0175265 A1 | 11/2002 | Bak et al. | |
| 2003/0042653 A1 | 3/2003 | Jiang et al. | |
| 2004/0038074 A1 | 2/2004 | Manuel | |
| 2004/0051027 A1 | 3/2004 | Manuel | |
| 2004/0103709 A1 | 6/2004 | Manuel et al. | |
| 2004/0128016 A1 | 7/2004 | Stewart | |
| 2004/0211047 A1 | 10/2004 | Moushon et al. | |
| 2004/0247725 A1 | 12/2004 | Lang et al. | |
| 2006/0055085 A1 | 3/2006 | Nakagawa et al. | |

FOREIGN PATENT DOCUMENTS

| | | |
|---|---|---|
| DE | 19533045 A1 | 3/1997 |
| EP | 0742094 A1 | 11/1996 |
| EP | 0 775 550 A1 | 5/1997 |
| EP | 1216 806 A2 | 6/2002 |
| GB | 38370/73 | 8/1973 |
| JP | 58-091123 | 5/1983 |
| JP | H04-086212 A | 3/1992 |
| JP | 2004-195720 A | 7/2004 |
| JP | 2006-061924 A | 3/2006 |
| WO | WO 8707538 | 12/1987 |
| WO | 3711470 A1 | 10/1988 |
| WO | WO 88/07932 | 10/1988 |
| WO | WO 95/08416 | 3/1995 |
| WO | 9939889 A1 | 8/1999 |
| WO | 0050209 A1 | 8/2000 |
| WO | WO 01/70450 A1 | 9/2001 |
| WO | WO 03/043795 | 5/2003 |
| WO | WO-A-9508416 | 8/2004 |

OTHER PUBLICATIONS

A New Rapid Tooling Method for Sheet Metal Forming Dies- D. Walczyk.

International Search Report and Written Opinion for corresponding PCT Application No. PCT/US05/45712, mailed Apr. 2, 2007, 12 pages.

International Search Report and Written Opinion for PCT Application No. PCT/US2006/037169, mailed Apr. 10, 2007, 18 pages.

* cited by examiner

METHOD FOR PRODUCING A TOOL

FIELD OF THE INVENTION

The invention generally relates to a tool having enhanced cooling characteristics and to a method for producing a tool having enhanced cooling characteristics and, more particularly to a tool and a method for producing, a tool which desirably produces items/objects in a highly efficient manner while concomitantly and substantially reducing the likelihood of stress type damage or destruction of the produced items/objects.

BACKGROUND OF THE INVENTION

A tool is used to selectively produce an item or object and, as used throughout this description, the term "tool" should be interpreted in the broadest manner possible and should not be limited to an exact configuration or type of configuration or to a certain tool assembly which is adapted to produce only a certain item/object or a certain class of items or objects.

Traditionally, a tool has been produced from a substantially solid block of material (i.e., by burning, cutting, or otherwise "working" the material in a certain manner). While the foregoing approach does allow a tool to be selectively produced, this traditional strategy or technique is highly inefficient and costly.

To overcome these drawbacks, a lamination technique/strategy has been developed and is set forth, for example and without limitation, within U.S. Pat. No. 6,587,742 ("The '742 Patent"), which is assigned to Applicant's assignee, which issued on Jul. 1, 2003, and which is fully and completely incorporated herein by reference, word for word and paragraph for paragraph.

Particularly, the foregoing lamination strategy involves the creation of a "soft tool design" (i.e., the tool is initially designed within a software environment) The soft design is then used to create physical tangible sectional members which are coupled and thereafter cooperatively form the tool. Such an approach is highly efficient and dramatically reduces the cost associated with prior tool production strategies and techniques.

Regardless of the technique or method for producing a tool, oftentimes the produced item is damaged by stress caused by the tool production operation (i.e., often referred to as "molded stress"). To alleviate this stress, oftentimes the "cycle time" or part/object production time is undesirably increased, thereby causing the object/item production or tooling operation to be relatively inefficient.

There is therefore a need for a new and improved tool and a method for producing a tool having enhanced cooling characteristics in order to overcome the foregoing drawbacks associated with prior tools and methods and Applicant has discovered that the lamination tool production strategy lends itself very well to the production of such a tool and to a tool producing method.

SUMMARY OF THE INVENTION

It is a first non-limiting object of the present invention to provide a tool having enhanced cooling characteristics.

It is a second non-limiting object of the present invention to provide a method for producing a tool having enhanced cooling characteristics.

It is a third non-limiting object of the present invention to provide a tool and a method for producing a tool which overcomes the various and previously delineated drawbacks of prior tools and methods for producing tools.

According to a first non-limiting aspect of the present invention, a tool is provided and includes a forming surface formed from a first material; an internal cavity containing at least one passageway; and a second material which at least partially circumscribes the at least one passageway.

According to a second non-limiting aspect of the present invention, a sectional member for use in a laminate type tool is provided and includes a frame portion which defines an internal area; and a spoke portion which extends into the internal area, wherein the spoke portion includes an arm which terminates onto the frame portion and an open circular portion which resides within the internal area.

According to a third non-limiting aspect of the present invention, a method for producing a tool comprising the steps of creating a first sectional member with a first passageway formation portion; creating a second sectional member with a second passageway formation portion; coupling the first sectional member to the second sectional member effective to cause the first passageway formation portion to register with the second passageway formation portion, thereby forming a pre-tool having an internal passageway; and causing thermally conductive material to adhere to at least part of the formed internal passageway, thereby forming a tool from the pre-tool.

These and other features, aspects, and advantages of the present invention will become apparent from a reading of the following detailed description of the preferred embodiment of the invention, including the subjoined claims, and by reference to the following drawings.

DETAILED DESCRIPTION OF THE PREFERRED EMBODIMENT OF THE INVENTION

Figure 1:
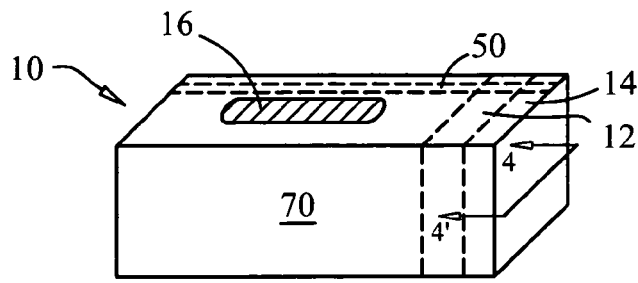
FIG. 1 is a perspective view of a tool which is made in accordance with the teachings of the preferred embodiment of the invention.

Referring now to FIG. 1, there is generally shown a tool 10 which is made in accordance with the teachings of the various inventions. Particularly, the tool 10 is a laminate type tool which is built by the sequential coupling of several sectional members, such as sectional members 12, 14. Moreover, the formed tool 10 includes a forming surface 16 which may be selectively used to form or create an object.

A more detailed description of the laminate tool construction technique or strategy may be found within The '742 Patent. However, it should be realized that any sort of lamination strategy may be used to selectively create the tool 10 and that nothing in this description is meant to limit the various inventions to a particular type of laminate tool creation strategy.

Figure 2:
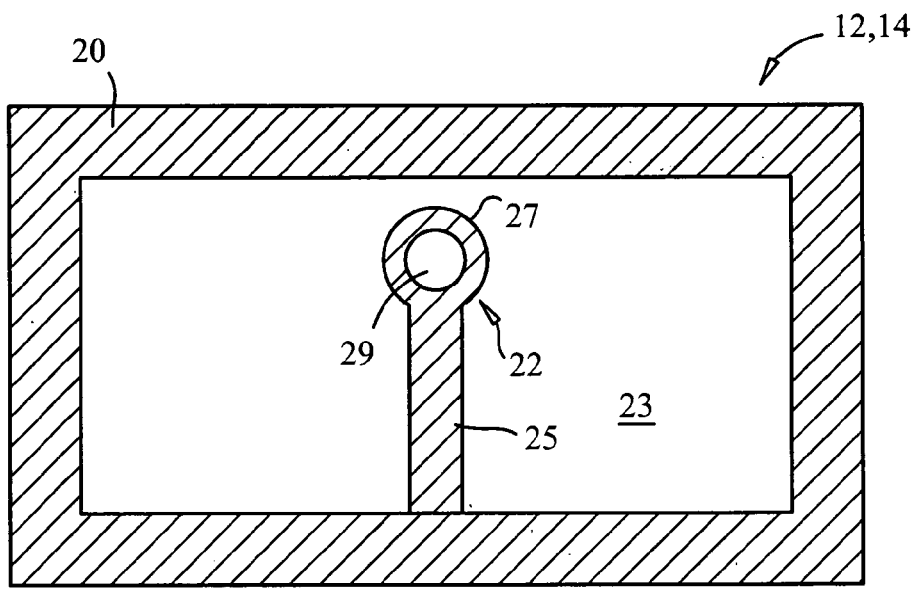
FIG. 2 is a side view of one of the sectional members which may be used to create the tool which is shown in FIG. 1 and which is made in accordance with the teachings of a first embodiment of the invention.

Referring now to FIG. 2, there is shown sectional member 12, which may be substantially similar to sectional member 14 and the various other sectional members used to create the tool 10, according to the teachings of a first non-limiting embodiment of the invention.

Particularly, sectional member 12 includes a generally flat frame portion 20 which, in one non-limiting embodiment of the invention, generally forms a rectangular shape. In one non-limiting embodiment of the invention, the frame portion 20 defines an internal area 23 and includes a spoke portion 22 which has a stem or arm portion 25 which terminates onto or into (or emanates from) the frame portion 20 and which extends from the frame portion 20 into the defined internal area 23. The stem portion 25 also terminates within or onto (or forms) a generally open and generally circular portion 27. As shown, the generally circular portion 27 includes an orifice 29 and the generally circular portion 27 resides within the generally defined internal area 23. In one non-limiting embodiment of the invention, the spoke portion 22 is integrally formed with the frame portion 20 and the generally circular portion 27 is integrally formed with the stem portion 25.

Further, it should be appreciated that each sectional member, such as sectional members 12, 14, may be formed from a substantially identical material, such as a carbon based or stainless type steel or aluminum, and each sectional member 12, 14 may be selectively bonded or coupled in order to thereafter cooperatively form the tool 10. The '742 Patent described one such non-limiting coupling arrangement.

In one non-limiting embodiment of the invention, each sectional member, such as sectional members 12, 14, have their respective orifices 29 (i.e., their respective "passageway formation portions") aligned or registered with the respective orifices 29 or passageway formation portions of the sectional members to which they are adjacently and abuttingly coupled to or engaged to. In this manner, an internal passageway, such as passageway 50, may be selectively formed within the selectively created tool 10 by the selective coupling of the various sectional members, such as sectional members 12, 14, which cooperatively form the tool 10.

It should be appreciated that the orifices 29 may of any desired shape and size, and that the respective portions 22 may also be of any substantially identical shape and size. Hence, it should be further appreciated that only some of the sectional members, such as sectional members 12, 14, may have registered orifices 29, thereby allowing the formed internal passageway to traverse only a portion of the tool 10.

Additionally, it should also be appreciated that each or some of the selectively coupled sectional member, such as sectional members 12, 14, may have multiple portions 22, which may be used in the foregoing manner to selectively create multiple internal passageways within the formed tool 10. That is, each orifice 29 of each portion 22 may be used to create a unique single internal passageway, such as passageway 50, within the formed tool 10, by being selectively and respectively aligned with at least one other unique orifice 29 of at least one other sectional member.

As shown best in FIGS. 1 and 2, the respective internal areas 23, of each selectively coupled sectional members, such as sectional members 12, 14, cooperatively form an internal cavity 70, within the formed tool 10 and that these selectively formed internal passageways, such as internal passageway 50, operatively reside within this internally formed tool cavity 70. In the most preferred embodiment of the invention, each selectively formed internal passageway, such as internal passageway 50, extends through one or both of the end sectional members, such as sectional member 14 (i.e., an "end" type sectional member, such as sectional member 14, means or refers to a sectional member which is only coupled to a single sectional member). It should be appreciated that a first sectional member, such as sectional member 12, may be coupled to a second sectional member, such as sectional member 14, by having its respective frame 20 be aligned with and coupled to the respective frame 20 of the second sectional member. In this manner, the formed internal passageways, such as internal passageway 50, may be accessed and selectively receive and discharge water (or some other medium) which is effective to selectively cool the tool, thereby reducing overall production cycle time and substantially reducing the likelihood of stress related damage to the produced part or tangible item. As discussed more fully below, the cooling, provided by these selectively formed cooling passageways such as passageway 50, may be dramatically enhanced by the introduction of thermally conductive material within the cavity 70 and/or purposefully placed in contact relationship with the various operatively contained cooling passageways, such as passageway 50.

Figure 3:
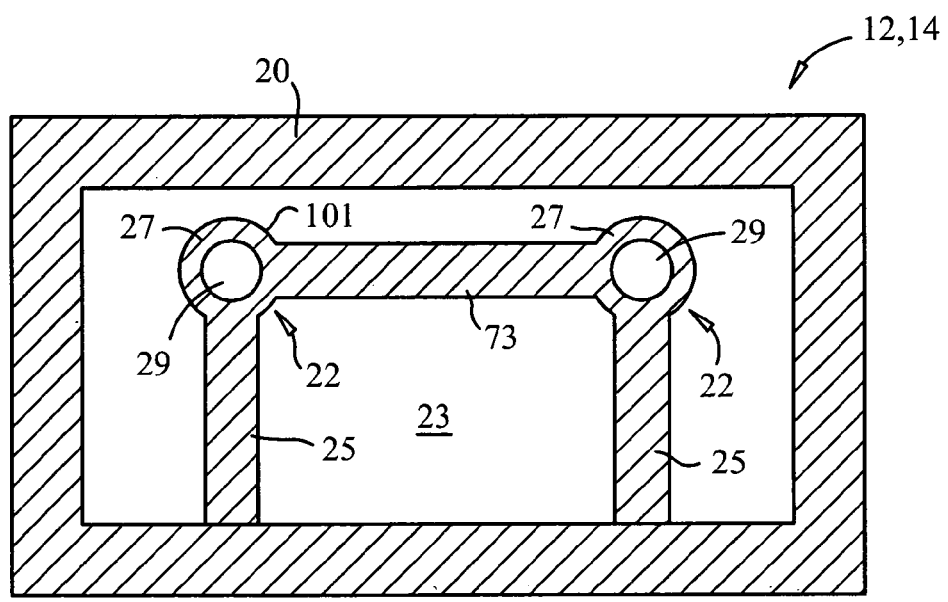
FIG. 3 is a side view of a sectional member which may be used to create the tool which is shown in FIG. 1 and which is made in accordance with the teachings of a second embodiment of the invention.
Figure 4:
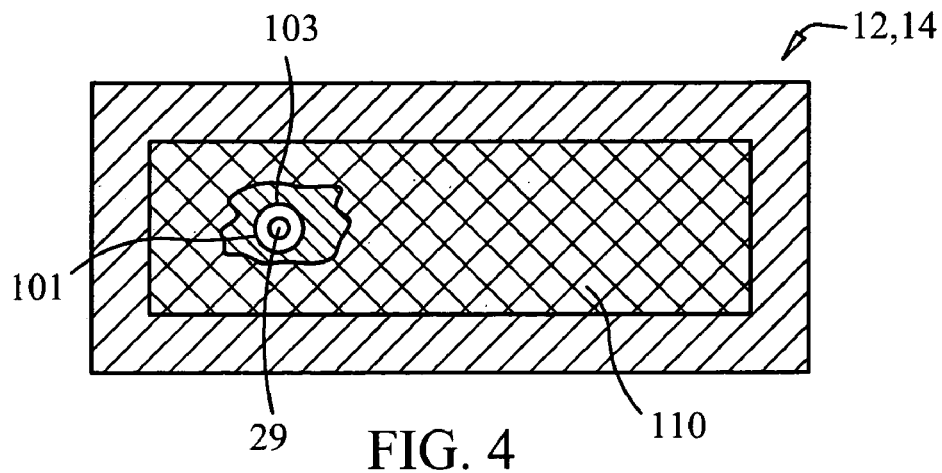
FIG. 4 is a sectional view of a first embodiment of the tool which is generally shown in FIG. 1 and which is taken along view line 4-4'.

Referring now to FIG. 3, as delineated above, one can see that in a non-limiting embodiment of the invention, each sectional member, such as sectional members 12, 14, may have a substantially identical pair of spoke portions 22 which are deployed into a respectively formed defined area 23 and which respectively include substantially identical generally circular portions 27, each having a respective and unique passageway formation portion or orifice 29. It should be realized that the pair of spoke portions 22 do not have to be substantially identical and that greater numbers of spoke portions 22 may be utilized, within or upon a sectional member, such as sectional member 12, 14, in other non-limiting embodiments of the invention. Further, in one non-limiting embodiment of the invention, each respectively and adjacently positioned pair of generally circular portions 27 of each sectional member, such as sectional members 12, 14, are coupled by coupling member 73, to further structurally strengthen the sectional members, such as sectional members 12, 14. In one alternate embodiment, each portion 22 is integrally formed with the frame portion 20 to which they respectively emanate from or terminate into.

In this "multiple spoke" embodiment, when the sectional members, such as sectional members 12, 14, are selectively coupled to cooperatively form the tool 10, each passageway formation portion 29 of a sectional member may be selectively and respectively registered with other unique passageway formation portions 29, in the foregoing manner, to selectively produce multiple passageways of various lengths within the cavity 70.

Regardless of the number of utilized spoke portions 22, the created tool 10 may selectively have enhanced cooling characteristics by the selective placement of thermally conductive material within the internal cavity 70 in the following manner.

That is, in a first non-limiting embodiment of the invention, a first pair of sectional members, such as sectional members 12, 14, are abuttingly engaged (i.e., their respective frames 20 are aligned and coupled), effective to overlay and have their respectively defined internal areas 23 become aligned and registered, thereby causing their respective orifices 29 to be communicatively registered and aligned. Powdered metal 110 is then placed within the overplayed, aligned, and previously registered defined interior areas 23 and the pair of abuttingly engaged sectional members, such as sectional members 12, 14, are bonded (i.e., their respective frames 20 are bonded) by brazing, while copper is made to infiltrate the powdered steel material, causing the abuttingly engaged pair of sectional members, such as sectional members 12, 14, to be bonded and causing the combination of powdered metal and copper to adhere to at least a portion of the outside surface 101 of the pair of previously aligned and registered generally circular portions 22 (i.e., the combination of the powdered metal and infiltrated copper (is denoted as material 103). As shown, the material 103 at least partially circumscribes this surface 101 (e.g., at least partially circumscribes the formed passageway which is selectively formed by the pair of aligned and registered orifices 29), and material 103 may reside in substantially all of the aligned internal areas 23, or just within a small portion. These first two coupled sectional members form a "pre-tool" assembly (i.e., a tool which is "under construction"), unless the tool 10 really is only comprised of this single pair of sectional members, such as sectional members 12, 14. In the latter case, the combined sectional members cooperatively form the final tool 10.

If additional sectional members are needed to complete the creation of the tool 10, then these additional sectional members are selectively and sequentially coupled to the pre-tool, in like manner. That is, the internal area 23 of the newly added sectional member is, made to overlay the internal area 23 which is formed by alignment of each of the previously coupled sectional members, such as sectional members 12, 14. The orifice 29 of this newly added sectional member is also aligned with the previously aligned orifices 29 of each of the previously coupled sectional members and the frame 20 of the new sectional member is coupled to and aligned with the frame 20 of one of the previously coupled sectional members. Powdered metal 110 is placed within the internally defined area 23 of the newly added sectional member and the new added sectional member is brazed onto the pre-tool (e.g., the frame 20 of the newly added sectional member is brazed unto the frame 20 of one of the previously coupled sectional members), while copper is infiltrated into the defined internal area 23 of this newly added sectional member, thereby coupling the newly added sectional member to the pre-tool, extending or "growing" the internal passage formed by all of the aligned orifices 29, and causing the thermally conductive material 103, formed from the combination of copper and powdered steel to at least partially circumscribed the surface 101 of the portion 22 of the newly added sectional member. In this manner, the pre-tool is selectively "grown" in a "sectional member by sectional member" manner, the passageway, such as passageway 50 is extended within the internal tool cavity 70, and the internal cavity 70 may be substantially filled with this material 103 and/or material 101, thereby resulting in a substantially "solid" tool 10 with a copper/braze "structure" which abuttingly engages and at least partially circumscribes the formed passageways, such as passageway 50.

It should be realized that while the foregoing discussion involves the selective formation of a single passageway within the tool 10, it is equally applicable to the selective formation of multi-passes formed from various portions 22. It should be further appreciated that, in an alternate embodiment of the invention, the respective stems 25 of each coupled sectional member, such as sectional members 12, 14, are broken in order to prevent interruption to the material 101 and/or 103 which may substantially fill the internal cavity 70.

The foregoing process may be especially applied or utilized when the sectional members, such as sectional members 12, 14, are formed from a "high temperature" material, such as carbon based steel or stainless steel. When the sectional members, such as sectional members 12, 14, are formed from a relatively low temperature material, such as aluminum, then care must be exercised to utilize a thermally conductive material within the cavity 70 which has a melting temperature which is less than the melting temperature of the material used to form the sectional members 12, 14.

Figure 5:
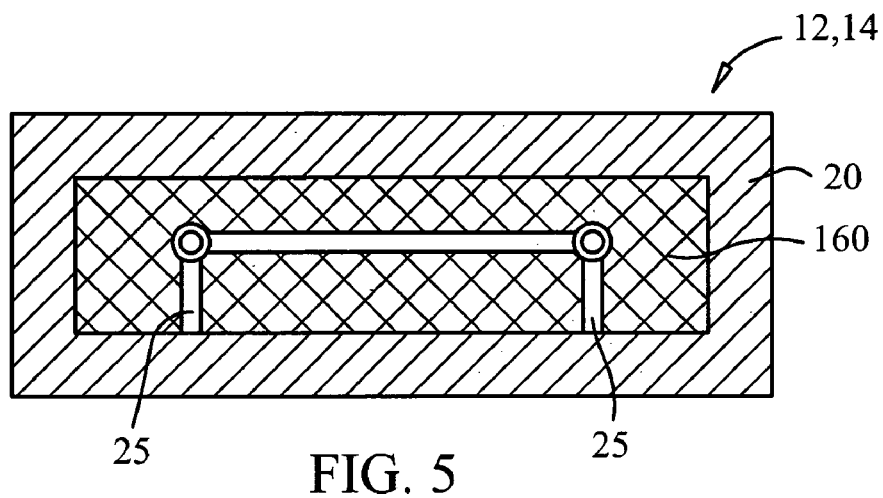
FIG. 5 is a view which is similar to that which is shown in FIG. 4 for the tool which is generally shown in FIG. 1, but which is made in accordance with the teachings of a second embodiment of the invention.
Figure 6:
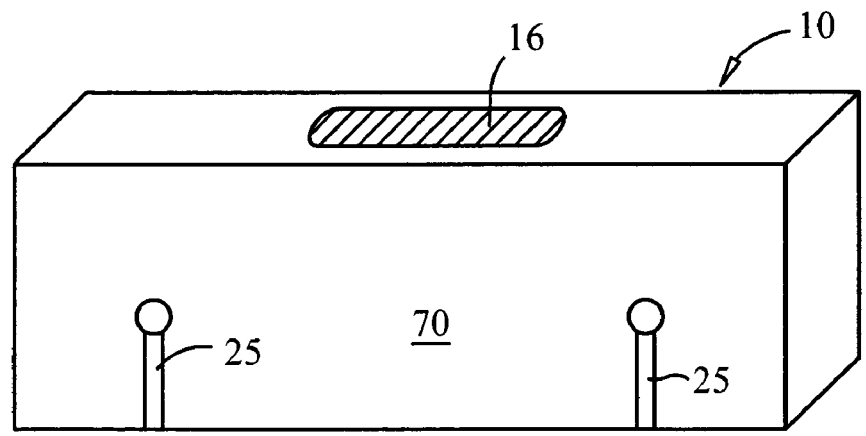
FIG. 6 is a view which is similar to that which is shown in FIG. 5 but illustrating the tool which is shown in FIG. 1 in a preliminary stage of completion.

Alternatively, after the tool 10 has been created, thermally conductive material 160, as shown only for example and without limitation in FIG. 5, may be inserted into the internally cavity 70, through one of the "end sectional members", such as sectional member 14. That is, as best shown in FIG. 6, the lamination sectional members, such as sectional members 12, 14, are readily adapted to selectively "grow" the tool 10 while concomitantly providing a very accessible cavity 70 which may be used for the deposition of thermally conductive material.

Particularly, in one non-limiting embodiment, after the various sectional members, such as sectional members 12, 14 have been bonded or attached, the cavity 70 can be castably (e.g., by a casting process) filled with copper, aluminum, or any desired thermally conductive material which has a melting temperature which is below the melting temperature of the material used to construct the sectional members, such as sectional members 12, 14, which are used to form the tool 10. The thermally conductive materials which are utilized within the cavity 70 may alternatively comprise thermally conductive epoxy, graphite, a combination of epoxy and graphite, or some other composite material. Further and desirably, the heat from the casting process may be used to substantially and concurrently bond or braze the sectional members, such as sectional members 12, 14, thereby reducing the overall energy requirements of the tool formation process. In one non-limiting embodiment, the thermally conductive material may be cast on -each surface 101 of each member 22 included within cavity 70. Additionally, Applicant has found that liquid cooper material will naturally fill gaps. Hence, cooper or a braze type paste may be pre-applied between each pair of adjacently abutting and engaged sectional members, such as members 12, 14 (e.g., on the respectively abutting frame portions 20), and when heat is generated by the molten material which is placed within the cavity 70, as part of a casting process, the pre-applied copper or braze paste flows between the adjacently coupled sectional members, such as sectional members 12, 14, to fill any gaps which may exist between these selectively coupled sectional members (e.g., between the respectively abutting frame portions 20).

It should be understood that the inventions are not limited to the exact construction and method which has been illustrated and described above, but that various modifications and changes may be made without departing from the spirit and scope of the inventions as are further delineated in the following claims. It should be appreciated that the thermally conductive material increases the overall cooling efficiency of the water (or other medium) which traverses the formed passageways, such as passageway 50, by efficiently transporting heat type energy to the contained medium from the tool 10. Such enhanced cooling reduces cycle time and greatly reduces the likelihood of stress type damage to the formed part or object. Further, and importantly, by casting "around" the passageways, such as passageway 50, (e.g., causing material 103 to at least partially circumscribe the formed passageways, such as passageway 50), or substantially filling the cavity 50 with material (e.g., material 101 and/or 103), the likelihood of leaks from the passageways to the tool surface (e.g., to the forming portion 16) is greatly minimized. One non-limiting example of an acceptable copper infiltration process is disclosed within pending U.S. patent application Ser. No. 10/000,910 which was filed on Nov. 1, 2001, which is fully and completely incorporated herein by reference, word for word and paragraph for paragraph and which is invented by the present inventor.

The invention claimed is:

1. A method for producing a tool comprising the steps of:
   creating a first sectional member with a first passageway formation portion;
   creating a second sectional member with a second passageway formation portion;
   coupling said first sectional member to said second sectional member in a manner effective to cause said first passageway formation portion to register with said second passageway formation portion, thereby forming a pre tool having an internal passageway; and
   causing thermally conductive material to adhere to at least part of said internal passageway, thereby forming a tool from said pre tool, said tool having said internal passageway;
   wherein said step of causing said thermally conductive material to adhere to said internal passageway further comprises the step of casting said thermally conductive material onto said internal passageway.

2. The method of claim 1 wherein said first sectional member and said second sectional member are formed from a substantially identical material.

3. The method of claim 2 wherein said substantially identical material comprises steel.

4. The method of claim 2 wherein said substantially identical material comprises aluminum.

5. The method of claim 1 wherein said thermally conductive material comprises copper.

6. The method of claim 1 wherein said thermally conductive material comprises conductive epoxy.

7. The method of claim 1 wherein said thermally conductive material comprises conductive graphite.

8. The method of claim 1 wherein said thermally conductive material comprises aluminum.

9. The method of claim 1 wherein each passageway formation portion is substantially identical.

10. The method of claim 1 wherein said coupling of said first sectional member to said second sectional member occurs by said thermally conductive material and occurs as said thermally conductive material adheres to said internal passageways.

11. The method of claim 1 further comprising forming an object by using the tool.

12. A method for producing a tool comprising the steps of:
    creating a first sectional member with a first passageway formation portion;
    creating a second sectional member with a second passageway formation portion;
    coupling said first sectional member to said second sectional member in a manner effective to cause said first passageway formation portion to register with said second passageway formation portion, thereby forming a pre tool having an internal passageway; and
    causing thermally conductive material to adhere to at least part of said internal passageway, thereby forming a tool from said pre tool, said tool having said internal passageway, wherein said thermally conductive material comprises the combination of powdered steel and copper which has been brazed to said internal passageway.

13. The method of claim 12 further comprising forming an object by using the tool.

14. A method for producing a tool comprising the steps of:
    creating a first sectional member with a first passageway formation portion;
    creating a second sectional member with a second passageway formation portion;
    coupling said first sectional member to said second sectional member in a manner effective to cause said first passageway formation portion to register with said second passageway formation portion, thereby forming a pre tool having an internal passageway; and
    causing thermally conductive material to adhere to at least part of said internal passageway, thereby forming a tool from said pre tool, said tool having said internal passageway;
    wherein each sectional member includes a frame portion defining an internal area; and
    wherein said first passageway formation portion includes a stem portion which is attached to said frame portion of said first sectional member and an open circular portion and wherein said second passageway formation includes a stem portion which is attached to said frame portion of said second sectional member and an open circular portion and wherein said method further comprises the steps of breaking each of said stem portions.

* * * * *